April 29, 1958

J. CIRONE 2,832,575

MIXER WITH DISPOSABLE BLADE

Filed July 27, 1956

Joseph Cirone
INVENTOR.

BY *[signatures]*
Attorneys

April 29, 1958 J. CIRONE 2,832,575
MIXER WITH DISPOSABLE BLADE
Filed July 27, 1956 2 Sheets-Sheet 2

Joseph Cirone
INVENTOR.

BY *[signature]*
Attorneys

United States Patent Office 2,832,575
Patented Apr. 29, 1958

2,832,575

MIXER WITH DISPOSABLE BLADE

Joseph Cirone, Jersey City, N. J.

Application July 27, 1956, Serial No. 600,492

4 Claims. (Cl. 259—108)

This invention relates to improvements in drink mixers and more particularly to a mixer with a disposable blade or agitator.

Conventional drink mixers are generally manufactured with the agitator thereof forming a permanent part of the drive shaft of the electric motor generally used for driving the agitator. Thus, after use in mixing drinks such as malted milks or milk shakes, and the like, the agitator blade is generally not thoroughly cleaned and the residue of the drink left on the agitator forms a seat and culture for bacteria. This is an extremely unsanitary and unhealthful practice. Therefore, the primary object of the present invention resides in the provision of a mixer which may be provided with a disposable blade so that a new blade may be utilized for the preparation of successive drinks.

In constructing a mixer with a disposable blade a problem is present. This problem is the strength of the material of the disposable blade which is used in the manufacture thereof. If the disposable blade is to be manufactured cheap enough so as to be inexpensive enough to readily discard after a single or even after only a few uses, it must be formed from a suitable plastic or composition material which is generally not of enough strength to adequately mix the drink without breaking unless the blade is suitably supported. If the blade is rigidly supported it may readily tend to shatter. Therefore the present invention contemplates an arrangement of parts wherein the agitator or blade is suitably resiliently supported and which arrangement of parts will not permit the blade to function or be rotated unless the blade is in a supported position.

These, together with the various ancillary objects and features of the invention which will become apparent as the following description proceeds, are attained by this mixer with disposable blade, a preferred embodiment of which has been illustrated in the accompanying drawings, by way of example only, wherein.

Figure 1:
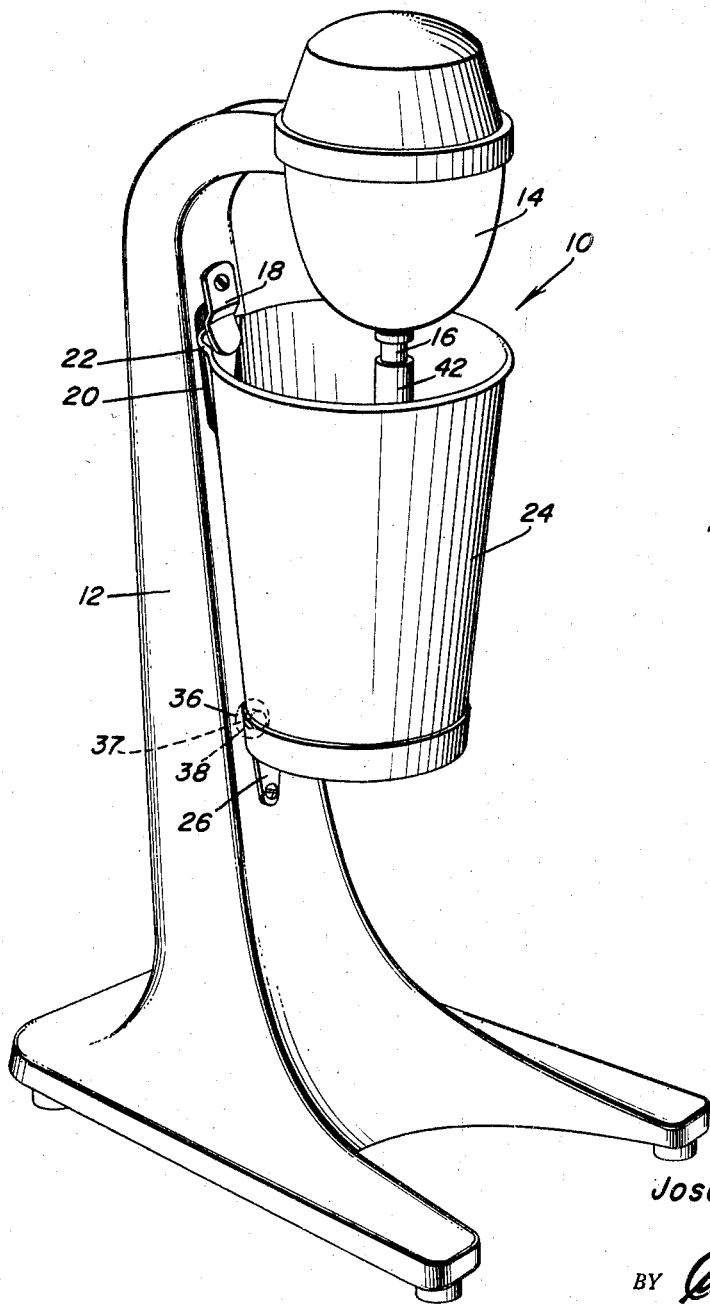
Figure 1 is a perspective view of the mixer comprising the present invention.
Figure 3:
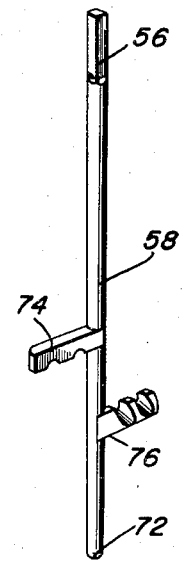
Figure 3 is a perspective view of one form of agitator which may be utilized in conjunction with the invention.

With continuing reference to the accompanying drawings wherein like reference numerals designate like parts throughout the various views, reference numeral 10 generally designates the mixer with disposable blade comprising the present invention. This mixer with disposable blade includes a support or stand 12 shaped as is conventional in drink mixers and carrying an electric motor 14 disposed in the usual position as on conventional drink mixers. The motor drives a drive shaft 16.

Secured to the support 12 is an upper retainer 18 which is positioned immediately above and in alignment with a recess 20 in the support 12. This recess is adapted to receive the lip 22 of a container 24 threrein for holding the upper portions of the container in a secure manner.

Figure 2:
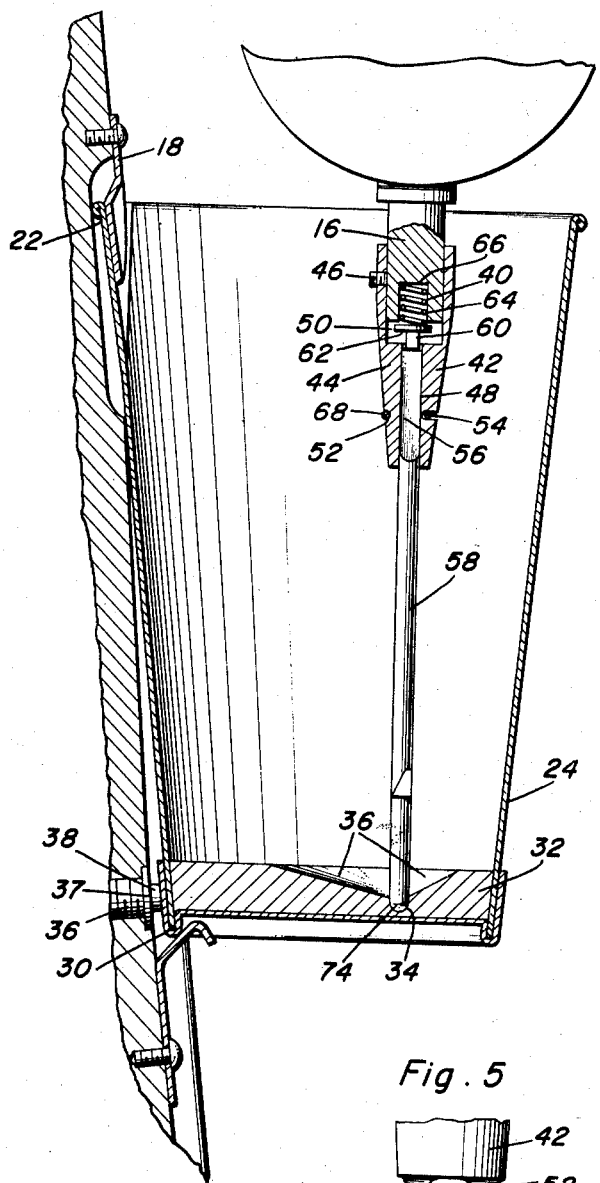
Figure 2 is an enlarged vertical sectional view illustrating a portion of the mixer and particularly the construction of the agitator and coupling means for securing the agitator to the drive shaft of the motor.

There is also secured to the support 12 a lower retainer 26 which is adapted to engage the bottom of the container 24 and lockingly hold the container 24 in position by engaging the flanged edge 30 of the container 24. The container 24 is provided with a rather thick base 32 which is recessed as at 34 and further provided with depressed portions as at 36 leading into the recess 34. Mounted on the support 12 is a switch 37 such as a button type or the like which actuating member 38 thereof will be depressed when the container 24 is in the position as is shown in Figure 2. This will connect the motor 12 with a suitable source of electrical current for revolving the drive shaft 16.

The drive shaft 16 is recessed as at 40. A coupling member 42 including a housing 44 is provided and is received over the shaft 16 and held in place by means of a set screw 46. The housing 44 is provided with a square shaped bore 48 extending therethrough into communication with the cavity 50 into which the shaft 16 extends. A groove 52 therein which extends deeply into the housing as at 54 to communicate with the bore 48.

Figure 4:
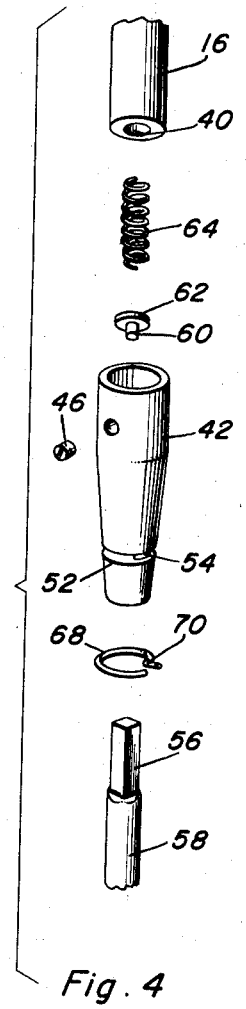
Figure 4 is an exploded view of the coupling means illustrating portions of the drive shaft and agitator.
Figure 5:
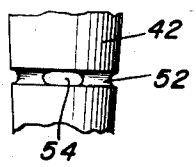
Figure 5 is an enlarged view of a portion of the housing forming one of the parts of the coupling member.

Received in the bore 48 is the end 56 of square shape in diameter of an agitator or mixing blade 58. Disposed in the cavity 50 is a member 60 having a head 62 adapted to be engaged by one end of a coil spring 64 disposed in the recess 40 and which coil spring engages the wall 66 of the shaft 16. The spring therefore presses upon the head 62 of the member 60 to urge the agitator 58 outwardly of the coupling member. A spring clip 68 is disposed in the groove 52 and resiliently frictionally engages the agitator 58 to hold it from falling once it is inserted in the bore 48. The spring 68 which can be best seen in Figure 4 includes a portion 70 which extends through the extensive portion as at 54 of the groove 52 to engage the agitator 58. The agitator 58 is provided with a rounded end as at 72 and has blades 74, 76, etc., preferably integrally molded therewith. The blade 58 may be molded out of a suitable synthetic plastic material or of any other suitable inexpensive and readily disposable material. The rounded end 72 is adapted to be received in the recess 34 in the base 32 and guided into the recess 34 by the sloping portions 36 leading to the recess 34. Hence, with a blade 58 inserted into the coupling member, the switch 36 can be actuated only when the container 24 is properly positioned and with the blade 58 having its end 72 received in the recess 34. The base therefor forms a bearing for the blade 58 and the blade 58 is normally urged into bearing engagement by the action of the spring 64 which prevents forming an adequate support for the disposable mixer blade 58 even if it is of relatively low strength.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A mixer comprising a support, a motor mounted on said support driving a drive shaft, an upper retainer secured to said support, a lower retainer secured to said standard below said upper retainer, a container removably held by said upper and lower retainers in alignment with said drive shaft, a coupling member secured to said drive shaft, an agitator removably secured to said coupling member, the base of said container having a recess therein receiving the free end of said agitator, and spring means in said coupling member resiliently urging said agitator into engagement with said recess in said base.

2. A mixer comprising a support, a motor mounted on said support driving a drive shaft, a container, means removably holding said container to said support in alignment with said drive shaft, a coupling member secured to said drive shaft, an agitator removably secured to said coupling member, the base of said container having a recess therein receiving the free end of said agitator, and spring means in said coupling member resiliently urging said agitator into engagement with said recess in said base.

3. A mixer comprising a support, a motor mounted on said support driving a drive shaft, an upper retainer secured to said support, a lower retainer secured to said standard below said upper retainer, a container removably held by said upper and lower retainers in alignment with said drive shaft, a coupling member, said coupling member including a housing detachably secured to said drive shaft, said drive shaft having a recess therein, a polygonal shaped bore in said housing, said housing having a groove therein communicating with said bore, an agitator having an end received in said bore, the base of said container having a recess therein receiving the free end of said agitator, a spring clip in said groove resiliently frictionally engaging said agitator, and spring means received in the recess in said drive shaft resiliently urging said agitator into engagement with said recess in said base.

4. A mixer comprising a support, a motor mounted on said support driving a drive shaft, a container, means removably holding said container to said support in alignment with said drive shaft, a coupling member, said coupling member including a housing detachably secured to said drive shaft, said drive shaft having a recess therein, a polygonal shaped bore in said housing, said housing having a groove therein communicating with said bore, an agitator having an end received in said bore, the base of said container having a recess therein receiving the free end of said agitator, a spring clip in said groove resiliently frictionally engaging said agitator, and spring means received in the recess in said drive shaft resiliently urging said agitator into engagement with said recess in said base.

References Cited in the file of this patent

UNITED STATES PATENTS

| | | |
|---|---|---|
| 1,529,830 | Blish et al. | Mar. 17, 1925 |
| 2,696,370 | Gafford | Dec. 7, 1954 |

FOREIGN PATENTS

| | | |
|---|---|---|
| 621,635 | Great Britain | April 13, 1949 |